March 10, 1970  D. P. LOWER  3,499,654
BEARING-SHAFT SEALING STRUCTURE
Filed Jan. 17, 1966  2 Sheets-Sheet 1

INVENTOR.
DONALD P. LOWER
BY M. A. Hobbs
ATTORNEY

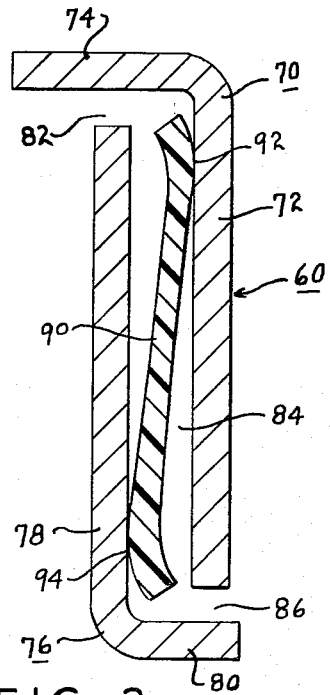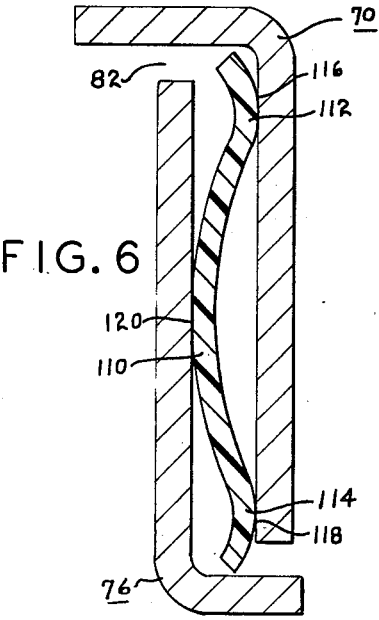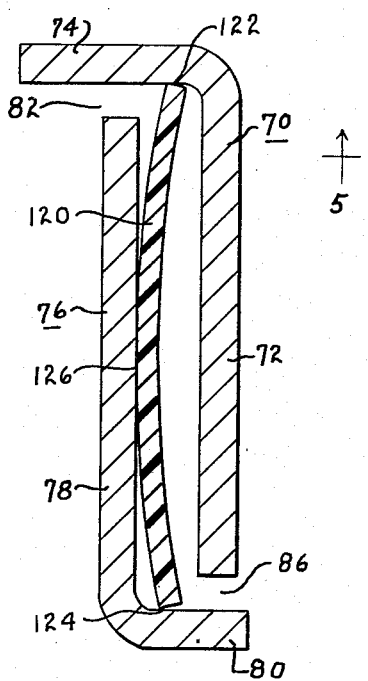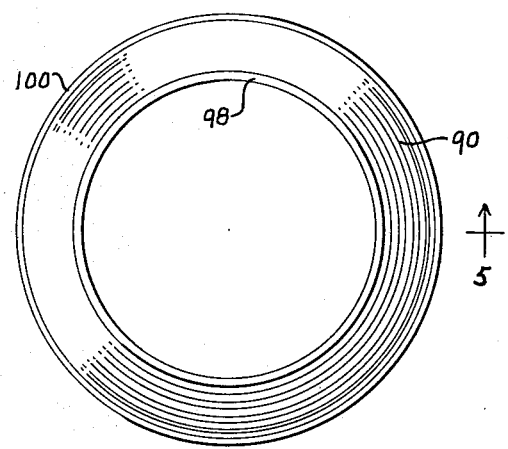
INVENTOR.
DONALD P. LOWER
BY M. A. Hobbs
ATTORNEY United States Patent Office 3,499,654
Patented Mar. 10, 1970

3,499,654
BEARING-SHAFT SEALING STRUCTURE
Donald P. Lower, Mishawaka, Ind., assignor to Reliance Electric Company, a corporation of Delaware
Filed Jan. 17, 1966, Ser. No. 534,927
Int. Cl. F16j 15/34, 15/32
U.S. Cl. 277—82                                    6 Claims

ABSTRACT OF THE DISCLOSURE

The sealing structure for a bearing and shaft combination in which spaced radially positioned, relatively rotating members form an annular space for a sealing member having annular areas contacting the opposed rotating members. The sealing member is a relatively rigid flexible element of plastic material and the sealing areas on opposite sides thereof are off-set axially and radially from one another.

---

The present invention relates to seals between rotating and stationary elements and more particularly to a sealing structure for use with a bearing and a rotating shaft journalled therein.

A seal extensively used in conjunction with bearings is a labyrinth type in which the sealing structure consists of a series of overlapping annular members on the stationary and rotating parts, forming an open but circuitous path from the lubricant chamber in the bearing to the outside. The lubricant in the bearing flows into the interstices between the various annular overlapping members and often oozes from the bearing along the shaft or shaft collar. While the lubricant in the channels in the sealing structure closes the channels to the extent of retarding the flow of lubricant from the bearing and the flow of foreign material, such as moisture, dust and grit, into the bearing, the sealing operation is not always effective and will sometimes permit an excessive amount of lubricant to flow from the bearing and an appreciable amount of moisture and other foreign matter to enter the bearing. Attempts have been made in the past to use flexible seals of rubber or similar material; however, these flexible seals have had certain inherent defects, such as excessive wear and premature failure, or failure to adapt themselves to excessive shaft misalignment without undue leakage of the lubricant. Hence, these elastomeric seals have not been found to be an effective substitute for the labyrinth type seal, particularly in bearings where substantial shaft misalignment is likely to occur in use. It is therefore one of the principal objects of the present invention to provide a bearing seal of the labyrinth type in which the ingress of foreign materials, including water, dust and grit, into the bearing, and egress of the lubricant from the bearing, are prevented or minimized, and which retains the effective adaptation to shaft and bearing without substantially altering the effective sealing characteristics of the sealing structure.

Another object of the present invention is to provide a seal construction having multiple sealing contact surfaces in combination with a labyrinth structure, in which the lubricant from the bearing provides effective lubrication for the contacting surfaces to prevent excessive wear therebetween, and which retains effective contact between the aforesaid surfaces regardless of shaft misalignment within all normal operating conditions.

Still another object of the invention is to provide a bearing-shaft sealing structure of the aforesaid type, which is relatively simple in construction and effective in operation in preventing excessive flow of lubricant from the foreign matter into the bearing, and which can be readily assembled in the bearing and easily cleaned and maintained in good operating condition throughout the normal life of the bearing-shaft installation.

A further object is to provide an element for use in a labyrinth type bearing which provides multiple contact surfaces for closing the path through the bearing to eliminate or minimize the flow of lubricant from the bearing and water and foreign matter into the bearing, and which can be readily adapted to various labyrinth type seals without any substantial changes in construction.

Additional objects and advantages of the invention will become apparent from the following description and accompanying drawings, wherein:

FIGURE 3 is an enlarged cross sectional view of one embodiment of the present sealing structure, the section being taken on line 3—3 of FIGURE 2;

FIGURE 4 is a side elevational view of an element of the present seal;

FIGURE 5 is a cross sectional view of the sealing element shown in FIGURE 4, the section being taken on line 5—5 of the latter figure;

FIGURE 6 is an enlarged cross sectional view similar to the view shown in FIGURE 3, but illustrating a modified form of the present invention; and FIGURE 7 is an enlarged cross sectional view similar to the view shown in FIGURE 3, but illustrating a further modified form of the present invention.

Figure 1:
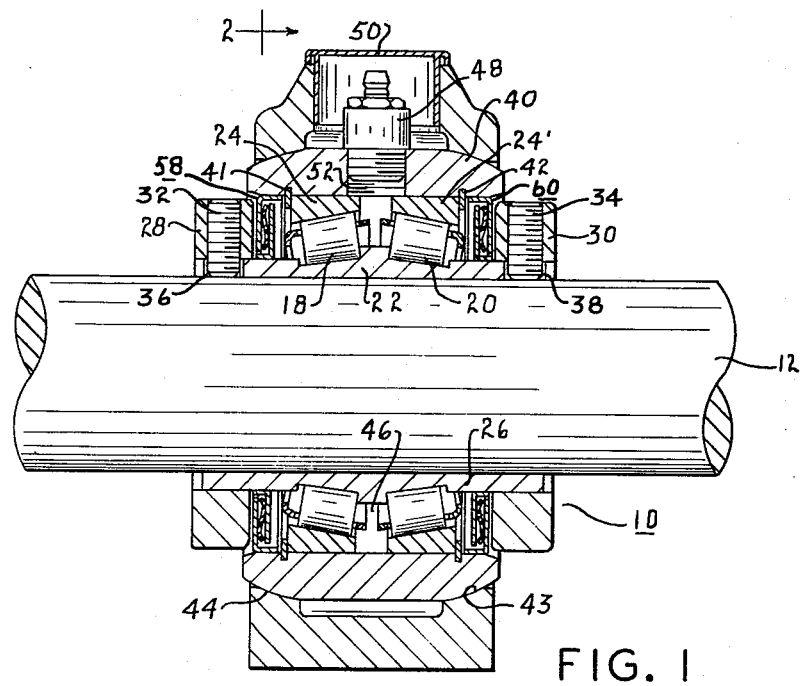
FIGURE 1 is a vertical cross sectional view through a bearing, having incorporated therein the present bearing-shaft seal structure, the section being taken on line 1—1 of FIGURE 2.
Figure 2:
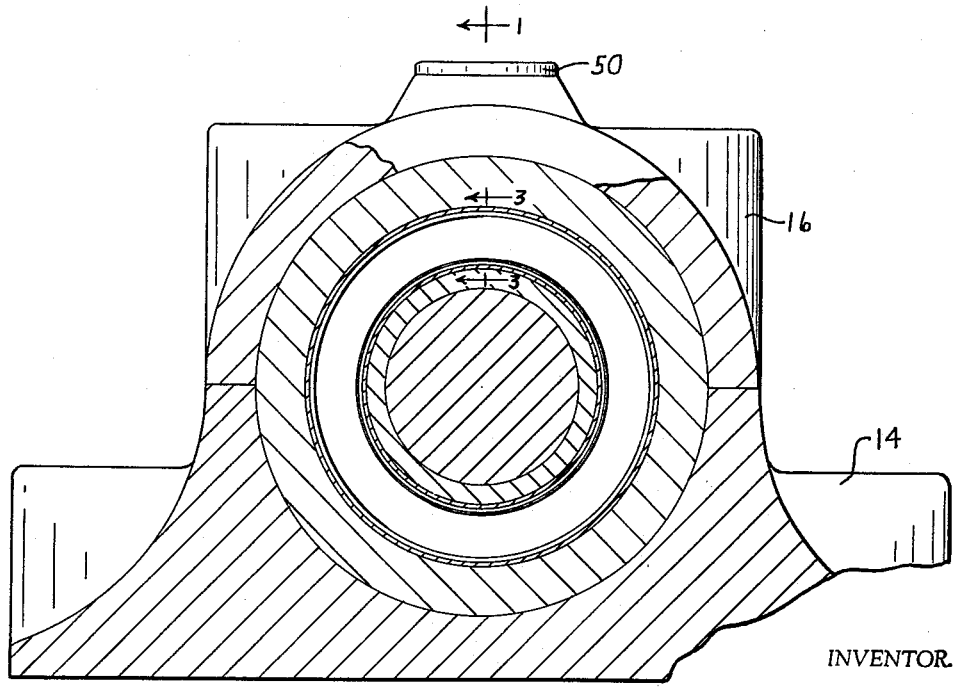
FIGURE 2 is a vertical cross sectional view of the bearing shown in FIGURE 1, the section being taken on line 2—2 of FIGURE 1.

Referring more specifically to the drawings, and to FIGURES 1 and 2 in particular, numeral 10 designates the present bearing or pillow block having shaft 12 journalled therein. The internal construction of the particular type of bearing is not important to the present sealing structure, which is capable of being used with a variety of shaft and bearing combinations having a stationary housing or body part and a rotatable member between which the present sealing structure is mounted.

The bearing shown in the drawings for illustrating the present invention consists of a housing having a base 14 and a body 16 secured to the base by a plurality of bolts (not shown), the housing containing roller bearings 18 and 20, each of the two bearings having an inner race 22 and an outer race 24. The inner races of the bearings are formed as a part of sleeve 26, which is mounted on shaft 12 and held firmly in place on the shaft by collars 28 and 30 in conjunction with set screws 32 and 34, respectively, extending through the collars and holes 36 and 38 in sleeve 26, and seating on the external surface of the shaft. The outer races are held in place in a ring 40 by snap rings 41 and 42, and the rings are provided with a curvature 43 for seating on surface 44 of similar configuration in the internal bore of the bearing housing. The arcuate surfaces 43 and 44 of the ring and housing permit the bearing to adjust itself to misalignment between the shaft and the bearing. Various types of lubricating means or structures may be provided for injecting suitable lubricant into the space or chamber 46 occupied by bearings 18 and 20, the one shown consisting of a fixture 48 enclosed in a cap 50 and seating in a threaded opening 52 communicating with chamber 46. The lubricant injected through fixture 48 into the chamber passes through and around the roller bearings and outwardly to the present sealing structure on each side designated by the numerals 58 and 60.

The two seals 56 and 60 close the ends of chamber 46 and occupy the space between the external surface of sleeve 26 and the internal surface of rings 40. Since the two sealing structures 58 and 60 are identical in construction and operation and use identical parts, only one will be described in detail herein. The bearing consists of an annular metal ring 70 having a radially extending portion 72 and an axially extending portion 74 joined integrally to the outer edge of portion 72 and being of such size that it fits snugly with ring 40. This external annular member remains stationary with the housing and substantially fills the space between sleeve 26 and ring 40 with the exception of the annular space near the inner edge thereof. A second annular member 76 is mounted on sleeve 26 and consists of a radially extending portion 78 and an axially extending portion 80 joined integrally with portion 78 and seating snugly on the external surface of sleeve 26. The outer edge of member 76 fills substantially the entire space between sleeve 26 and ring 40, with the exception of the space at the peripheral edge thereof. The two members 70 and 76 fit sufficiently tight on their respective surfaces that they are held firmly in place and in spaced relation both axially and radially. The configuration and relationship of these two parts produces a circuitous path consisting of annular opening 82, radially extending space 84 and annular opening 86 at the outer edge of the bearing and near the external surface of sleeve 26.

A sealing element 90 of annular shape is seated in annular space 84 and has a generally modified S cross sectional configuration to provide sealing contacts at points 92 near the outer edge of the sealing structure and 94 near the inner edge of the sealing structure. Element 90 is formed of relatively rigid but flexible plastic material and is sufficiently firm to apply light pressure at points 92 and 94, the element preferably consisting of nylon containing one or more special ingredients to improve the bearing and/or sealing characteristics of the element. As seen in FIGURE 5, the element consists of a generally straight intermediate configuration 96 and inwardly and outwardly radially extending margins or flanges 98 and 100, thereby providing a structure which gives effective contact between the element and the corresponding surfaces of members 70 and 76. The element "floats" between the two members either remaining stationary or rotating slowly, though remaining in full contact with members 70 and 76, with the exception of a light lubricating film therebetween.

When injected into chamber 46, the lubricant readily finds its way into opening 82 and passes into space 84, but is prevented from passing freely from the passage by the contact between element 90 and the inner surface of member 76 at point 94. A small amount of lubricant will find its way between the element and the adjacent wall of member 76 and provide adequate lubricant to prevent excessive wear between the element and member. Any water, dust and grit which may find its way into opening 86 and space 84, is prevented from passing further into the bearing by the contact provided between the element and the adjacent inner surface of member 70 at point 92. Thus, it is seen that the present seal not only provides a circuitous path through which the lubricant must pass in flowing from lubricant chamber 46 and dirt moving inwardly through opening 86, but also provides a positive effective seal in the passage, thereby effectively preventing egress of excessive lubricant and ingress of foreign materials. The present structure can readily be assembled in a bearing and, when member 70 is removed, the element can be easily lifted from the sealing structure.

In the modified form illustrated in FIGURE 6, the two members 70 and 76 are the same as those shown in the previous embodiment, and hence will be given the same numbers in this modification. The sealing element in this modified form has an annular configuration with an arcuate intermediate section 110 and arcuate margins or flanges 112 and 114 extending in the direction reverse to the arcuate intermediate section 110. This element is likewise constructed of relatively rigid but flexible plastic material which endeavors to maintain its own shape so that it applies pressure at annular points 116 and 118 against the internal surface of member 70 and at point 120 on the internal surface of member 76. It can readily be seen from FIGURE 6 that any lubricant endeavoring to flow from the chamber through opening 82 will be entrapped at point 120 and prevented from flowing through the sealing structure; however, sufficient lubricant will flow between the element and internal surface of member 76 to properly lubricate the contacting surfaces. Likewise, moisture and dirt are prevented from entering the bearing by contacting surfaces at point 114; however, any dirt which may find its way past this point is effectively prevented from flowing further by the contact between the element and the internal surface of member 70 at point 116.

In the modified form shown in FIGURE 7, the two members 70 and 76 are the same as those shown and described with reference to the previous embodiments; however, element 120 is of different configuration, being generally of an arcuate cross sectional shape and providing two positive contacting points at the outer and inner ends 122 and 124, respectively, the two ends seating firmly against the inner surfaces of portions 74 and 80 of members 70 and 76, respectively, to form an effective block to the egress of lubricant from chamber 46 through annular passage 82 and the ingress of foreign matter through annular passage 86. A firm contact is provided between the cross sectional center of the element and the internal surface of member 76 at point 126, the lubricating material finding its way between the two contacting surfaces to provide sufficient lubricant for normal and satisfactory operation. This structure can likewise be assembled and disassembled readily and serviced as required, and when assembled provides an effective positive closure between the lubricating chamber and the external surface of the bearing.

I claim:

1. A sealing structure for a bearing and shaft combination, comprising a stationary part with a bore therethrough and a rotating part therein, a first annular member having means engaging said stationary part and a radially inwardly extending portion, said first annular member disposed between said stationary part and said rotating part, a second annular member having means engaging said rotating part and a radially outwardly extending portion, said second annular member disposed between said stationary part and said rotating part, said radially extending portions of the annular members being axially spaced from one another, and a relatively rigid but flexible annular element of plastic material and of one-piece imperforate construction disposed in the space between said radially extending portions, said element having radially and axially offset annular areas of preformed configuration and having one of said annular areas contacting one of said radially extending portions and the other of said annular areas contacting the other of said radially extending portions in radially spaced positions, said annular element being free to rotate with respect to both of said members.

2. The sealing structure as defined in claim 1, in which the inner edge of said first mentioned annular member is spaced from said rotating part and the outer edge of said second annular member is spaced from said stationary part.

3. The sealing structure as defined in claim 1, in which said means engaging said stationary part is an axially extending flange and said means engaging said rotating part is an axially extending flange.

4. The sealing structure as defined in claim 3, in which the inner edge of said first mentioned annular member is spaced radially outwardly from the flange of said second mentioned annular member and the outer edge of said second annular member is spaced radially inwardly from the flange of said first mentioned annular member.

5. The sealing structure as defined in claim 1, in which said annular element is of modified S-shape configuration in cross section with one margin thereof engaging one of said members and the other margin thereof engaging the other of said members.

6. The sealing structure as defined in claim 1, in which said annular element is of an arcuate cross sectional shape with reversed marginal portions in contact with the same member and the center between said marginal portions in contact with the other of said members.

References Cited

UNITED STATES PATENTS

| 2,509,461 | 5/1950 | Ulseth | 277—95 X |
| 2,678,837 | 5/1954 | Griefen | 277—95 |
| 2,705,161 | 3/1955 | Shafer | 277—82 |
| 2,727,764 | 12/1955 | Covert et al. | 277—94 |
| 3,147,015 | 9/1964 | Hanback | 277—205 |

FOREIGN PATENTS

| 1,021,214 | 12/1957 | Germany. |
| 459,104 | 1/1937 | Great Britain. |
| 763,679 | 12/1956 | Great Britain. |

LAVERNE D. GEIGER, Primary Examiner

J. S. MEDNICK, Assistant Examiner

U.S. Cl. X.R.

277—95, 205; 308—36.1